United States Patent
Agarwal et al.

(10) Patent No.: US 10,924,602 B2
(45) Date of Patent: Feb. 16, 2021

(54) ELECTRONIC DEVICE AND METHOD FOR CONTROLLING SAME

(71) Applicant: Samsung Electronics Co., Ltd., Suwon-si (KR)

(72) Inventors: Pankaj Agarwal, Suwon-si (KR); Hyung-sun Lee, Yongin-si (KR); Ho-chul Shin, Yongin-si (KR); Youn-ho Choi, Seoul (KR); Heung-ryong Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 15/776,270

(22) PCT Filed: Nov. 9, 2016

(86) PCT No.: PCT/KR2016/012840
§ 371 (c)(1),
(2) Date: May 15, 2018

(87) PCT Pub. No.: WO2017/086651
PCT Pub. Date: May 26, 2017

(65) Prior Publication Data
US 2020/0259943 A1 Aug. 13, 2020

(30) Foreign Application Priority Data
Nov. 16, 2015 (KR) .................. 10-2015-0160610

(51) Int. Cl.
*H04M 1/725* (2006.01)
*G06K 15/00* (2006.01)

(52) U.S. Cl.
CPC .......... *H04M 1/725* (2013.01); *G06K 15/002* (2013.01)

(58) Field of Classification Search
CPC ............... H04M 1/725; H04M 1/7253; H04M 1/72522; H04M 1/72544; H04L 51/046; H04L 51/10; G06F 21/31; G06F 3/0482; G06K 15/022
See application file for complete search history.

(56) References Cited

U.S. PATENT DOCUMENTS

| | | |
|---|---|---|
| 9,535,571 B2 | 1/2017 | Kim |
| 9,699,286 B2 | 7/2017 | Yun |
| 9,749,269 B2 | 8/2017 | Jung et al. |
| 2010/0253805 A1 | 10/2010 | Yasuda |

(Continued)

FOREIGN PATENT DOCUMENTS

| | | |
|---|---|---|
| JP | 2002-057978 A | 2/2002 |
| JP | 4136491 B2 | 8/2008 |

(Continued)

*Primary Examiner* — Thanh C Le
(74) *Attorney, Agent, or Firm* — Jefferson IP Law, LLP

(57) ABSTRACT

A method for controlling an electronic device includes activating a display unit of an electronic device, following the activation of the display unit, displaying a lock screen containing image content prestored in the electronic device, receiving the input of a user command for selecting information about the displayed image content, and, following the input of the user command, storing, in connection with the image content selected according to the user command, information about the image content, while continuously displaying the lock screen.

12 Claims, 17 Drawing Sheets

(56) References Cited

U.S. PATENT DOCUMENTS

| | | |
|---|---|---|
| 2012/0084691 A1 | 4/2012 | Yun |
| 2012/0331548 A1 | 12/2012 | Tseng et al. |
| 2014/0317543 A1 | 10/2014 | Kim |
| 2015/0085317 A1 | 3/2015 | Kim et al. |
| 2015/0169168 A1 | 6/2015 | Vigneras et al. |
| 2015/0185969 A1* | 7/2015 | Bae .................. H04M 1/72544 715/790 |
| 2015/0215573 A1 | 7/2015 | Hast |
| 2016/0006678 A1 | 1/2016 | Jung et al. |

FOREIGN PATENT DOCUMENTS

| | | |
|---|---|---|
| KR | 10-2012-0033515 A | 4/2012 |
| KR | 10-1179890 B1 | 9/2012 |
| KR | 10-1180584 B | 9/2012 |
| KR | 10-2013-0069151 A | 6/2013 |
| KR | 10-2014-0124540 A | 10/2014 |
| KR | 10-1495257 B1 | 2/2015 |
| KR | 10-2015-0123748 A | 11/2015 |

* cited by examiner

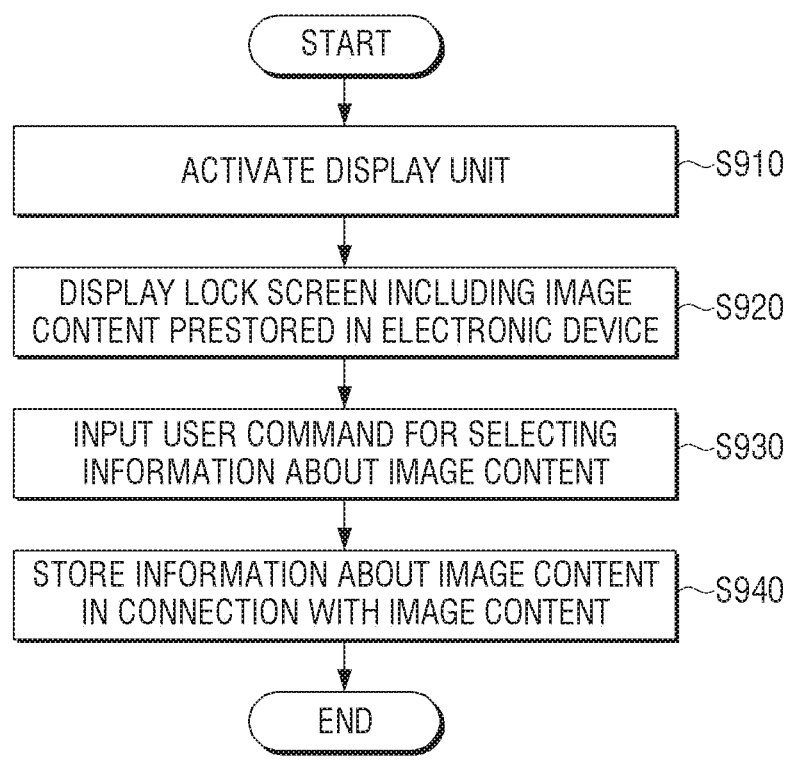

ELECTRONIC DEVICE AND METHOD FOR CONTROLLING SAME

TECHNICAL FIELD

Apparatuses and methods consistent with the disclosure relate to an electronic device and a method for controlling the same, and more particularly, to an electronic device for securing a storage space by tagging an importance level of an image content, and a method for controlling the same.

BACKGROUND ART

Devices capable of capturing and storing an image content or downloading and storing the image content like smartphones, tablet PCs, and the like have recently increased. Also, many users store a large number of image contents in one electronic device, but a storage space of the electronic device is limited, and the number of image contents used by the users is also limited.

As a result, users of an electronic device store new contents by deleting image contents, which are not frequently used, from prestored image contents. However, a job of selecting and deleting image contents, which are not frequently used, by checking image contents is very inconvenient.

Therefore, there is a need for efficiently managing a storage space by deleting stored image contents more conveniently and intuitively.

DETAILED DESCRIPTION OF THE INVENTION

Technical Problem

The disclosure provides an electronic device for deleting an image content conveniently if a storage space is insufficient, by tagging and storing importance information of the image content on the image content according to an input user command, and a method for controlling the same.

Technical Solution

According to an aspect of the disclosure, a method for controlling an electronic device, includes activating a display unit of the electronic device; following the activation of the display unit, displaying a lock screen including an image content prestored in the electronic device, receiving an input of a user command for selecting information about the displayed image content, and following the input of the user command, storing, in connection with the image content selected according to the user command, information about the image content, while continuously displaying the lock screen.

The displaying may include displaying the image content in at least a portion of the lock screen while displaying the lock screen.

The displaying may include receiving an input of a user command for unlocking the lock screen, wherein following the input of the user command for unlocking the lock screen, the image content prestored in the electronic device is displayed in at least a portion of a display screen.

The storing may further include determining the information about the image content according to a drag direction in which the user command is input.

The displaying may include selecting and displaying the image content based on at least one selected from a time when the image content is stored in the electronic device, a name of the image content, the number of times checking the image content, and a date at which the image content is lastly opened.

The displaying may include, merely following an occurrence of a particular event, displaying the lock screen including the image content prestored in the electronic device.

The particular event may include at least one selected from a storage of the preset number or more of image contents within a preset time, a storage of a plurality of continuously captured image contents, a storage space of the electronic device remaining to a preset value or less, a position of the electronic device in a preset place, and an input of a user command.

The method may further include determining whether to delete the image content based on the information about the stored image content.

The displaying may include displaying the lock screen including the image content in at least one selected from a frame format, a background format, a button format, and an icon format in at least a portion of the display screen.

According to another aspect of the disclosure, an electronic device includes a display unit, an input unit for receiving an input of a user command for selecting information about an image content, a storage unit, and a controller for activating the display unit, following the activation of the display unit, controlling the display unit to display a lock screen comprising an image content prestored in the electronic device, following an input of a user command through the input unit, for selecting the information about the displayed image content, controlling the display unit to continuously display the lock screen, and storing, in connection with the image content selected according to the user command, the information about the image content in the storage unit.

The controller may control the display unit to display the image content in at least a portion of the lock screen while displaying the lock screen.

Following an input of a user command through the input unit, for unlocking the lock screen, the controller may control the display unit to display the image content prestored in the electronic device in at least a portion of a display screen.

The controller may determine the information about the image content according to a drag direction in which the user command is input.

The controller may control the display unit to select and display the image content based on at least one selected from a time when the image content is stored in the electronic device, a name of the image content, the number of times checking the image content, and a data at which the image content is lastly opened.

The controller may control the display unit to display the lock screen including the image content prestored in the electronic device, merely following an occurrence of a particular event.

The particular event may include at least one selected from a storage of the preset number or more of image contents within a preset time, a storage of a plurality of continuously captured image contents, a storage space of the electronic device remaining to a preset value or less, a position of the electronic device in a preset place, and an input of a user command.

The controller may determine whether to delete the image content based on the information about the stored image content.

The controller may control the display unit to display the lock screen including the image content in at least one selected from a frame format, background format, a button format, and an icon format.

Effects of the Invention

According to various exemplary embodiments of the disclosure as described above, a user may efficiently secure a storage space of an electronic device through a simple manipulation.

DESCRIPTION OF THE DRAWINGS

FIG. 9 is a flowchart of a method for controlling an electronic device according to an exemplary embodiment of the disclosure.

BEST MODE OF THE INVENTION

Figure 1:
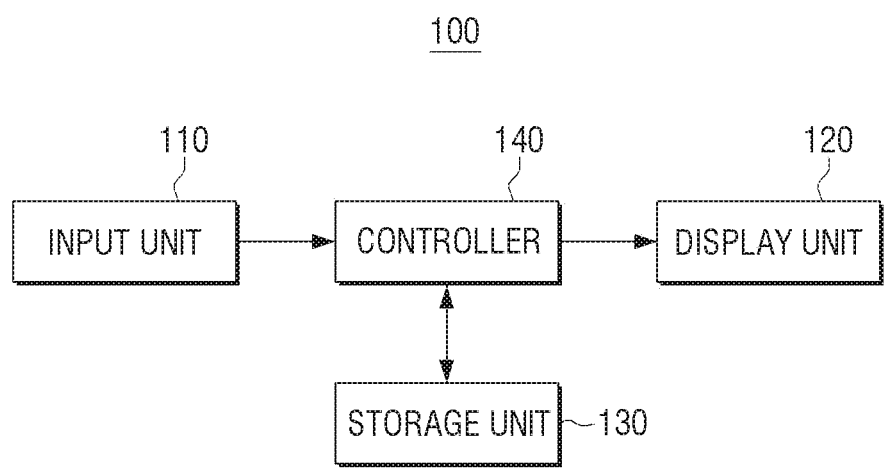
FIG. 1 is a block diagram of a simple configuration of an electronic device according to an exemplary embodiment of the disclosure.

Terminology used herein will be described in brief, and exemplary embodiments of the disclosure will be descried in detail.

Terms used herein are selected from general terms, which are currently widely used, in consideration of functions in the disclosure but may vary with intentions of those skilled in the art or precedents, emergences of new technologies, and the like. Also, there are terms, which are arbitrarily selected by an applicant, in a particular case, and meanings thereof will be described in detail in descriptions of exemplary embodiments corresponding to this case. Therefore, terms used in the exemplary embodiments are defined based on meanings thereof and contents all over the exemplary embodiments not based on simple names thereof.

Although the terms first, second, etc. may be used herein to describe various elements, these elements may not be limited by these terms. These terms are merely used to distinguish one element form another element. For example, a first element may be termed a second element, and, similarly, the second element may also be termed the first element without departing from the scope of exemplary embodiments. As used herein, the term "and/or" includes any and all combinations of one or more of the associated listed items.

As used herein, the singular forms are intended to include the plural forms as well, unless the context clearly indicates otherwise.

The terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the exemplary embodiments, a "module" or "part" may perform at least one function or operation and may be embodied as hardware, software, or a combination of hardware and software. Also, a plurality of "modules" or a plurality of "parts" may be embodied as at least one processor by being integrated into at least one module except for a "module" or a "part" which is to be embodied as particular hardware.

In addition, in the exemplary embodiments of the disclosure, when a part is referred to as being "connected to" or "coupled to" another part, it may be directly electrically connected or coupled to the other part or intervening elements may be present.

Also, in exemplary embodiments of the disclosure, a user input may include at least one selected from a touch input, a bending input, a voice input, a button input, and a multimodal input but is not limited thereto.

In addition, in the exemplary embodiments of the disclosure, an "application" refers to a series of computer program groups devised for performing a particular task. The application may be diverse in the exemplary embodiments of the disclosure. For example, the application may be a game application, a moving picture play application, a map application, a memo application, a calendar application, a phone book application, a broadcast application, an exercise support application, a payment application, a photo folder application, or the like but is not limited thereto.

Unless otherwise defined, all terms (including technical and scientific terms) used herein have the same meaning as commonly understood by those skilled in the art to which exemplary embodiments belong. It will be further understood that terms, such as those defined in commonly used dictionaries, may be interpreted as having a meaning that is consistent with their meaning in the context of the relevant art and will not be interpreted in an idealized or overly formal sense unless expressly so defined herein.

Hereinafter, the disclosure will be described with reference to the drawings. FIG. 1 is a block diagram of a configuration of an electronic device according to an exemplary embodiment of the disclosure. Referring to FIG. 1, an electronic device 100 includes an input unit 110, a display unit 120, a storage unit 130, and a controller 140. The electronic device 100 according to an exemplary embodiment of the disclosure may be realized as various types of electronic devices such as a smartphone, a smartwatch, smart glasses, a tablet PC, a notebook PC, and the like.

The input unit 110 receives an input of a user command. In particular, the input unit 110 receives an input of a user command of a displayed image content.

The display unit 120 outputs image data. In particular, the display unit 120 may display an image content in at least a portion of a display screen. Here, the image content may be a photo, a moving picture, or the like stored in the electronic device 100.

The storage unit 130 stores various types of modules for driving the electronic device 100. In particular, the storage unit 130 may store importance information of the image content by tagging the importance information on the image content according to the user command input through the input unit 110. Here, the importance information may be classified into high and low levels or into a plurality of levels, and if a particular event occurs, an image content having a low importance level may be deleted, and an image content having a high importance level may be kept in a stored state.

The controller 140 controls an overall operation of the electronic device 100. In particular, the controller 140 controls the display unit 120 to display an image content in at least a portion of the display screen and stores importance information of the image content in the storage unit 230 by tagging the importance information on the image content according to the user command input through the input unit 110. Also, if a storage space of the electronic device 100 is used to a preset value or more, the controller 140 determines whether to delete the image content based on the importance information of the image content.

In detail, the controller 140 may control the display unit 120 to display the image content in the at least portion of the display screen. In particular, the controller 140 may control the display unit 120 to display the image content in at least a portion of a lock screen while displaying the lock screen. For example, if a user command for turning on a screen is input when the electronic device 100 is in a standby state, the controller 140 may control the display unit 120 to display the image content together in at least a portion of the lock screen while displaying the lock screen. Here, the lock screen may be a screen which is displayed if the display screen is turned on through the input of the user command when power of the electronic device 100 is turned on, and the display screen is turned off. If a user command for unlocking the lock screen (e.g., an input for dragging a particular icon in a preset direction) is input, the electronic device 100 may be unlocked.

Also, if the user command for unlocking the lock screen is input through the input unit 110, the controller 140 may control the display unit 120 to unlock the lock screen and display an image content in at least a portion of the display screen where the lock screen is unlocked. In addition, if a user command for dragging in a preset direction is input through the input unit 110 on a home screen while displaying the home screen, the controller 140 may control the display unit 120 to display the image content together in at least a portion of a standby screen while displaying the standby screen. For example, if a user command for dragging a notification bar in an opening direction is input through the input unit 110 while displaying the home screen, the controller 140 may control the display unit 120 to display a notification window including an image content in at least a portion. Alternatively, if a user command for dragging in a direction moving to a home screen including a widget displaying an image content is input through the input unit 110 while displaying the home screen, the controller 140 may control the display unit 120 to display the widget displaying the image content in at least a portion of the standby screen.

Also, merely if a particular event occurs, the controller 140 may control the display unit 120 to display an image content in at least a portion of the display screen. For example, if the preset number or more of image contents are stored within a preset time, if a plurality of continuously captured image contents are stored, if a usable storage space of the electronic device 100 remains to a preset value or less, if the electronic device 100 is determined as being in a preset place, or if a user command is input, the controller 140 may control the display unit 120 to display an image content stored in at least a portion of the display screen.

Here, the controller 140 may control the display unit 120 to select and display an image content based on at least one selected from a time when the image content is stored, a name of the image content, the number of times the image content is checked, and a date at which the image content is lastly opened. The controller 140 may also control the display unit 120 to display the image content in at least one selected from a frame format, a background format, a button format, and an icon format in at least a portion of the display screen.

Also, the controller 140 may store importance information of an image content in the storage unit 130 by tagging the importance information on the image content according to a user command of the displayed image content input through the input unit 110. In particular, the controller 140 may determine the importance information of the image content according to a drag direction into which a user command is input and store the determined importance information by tagging the determined importance information on the image content.

If a storage space of the electronic device 100 is used to a preset value or more, the controller 140 may determine whether to delete an image content based on importance information of the image content.

The controller 140 may also control the display unit 120 to display guidance words for deleting the image content according to the determination result. In addition, the controller 140 may delete the image content which is to be determined as being deleted.

By the electronic device 100 as described above, a user may secure a storage space through minimum user inputs.

Figure 2:
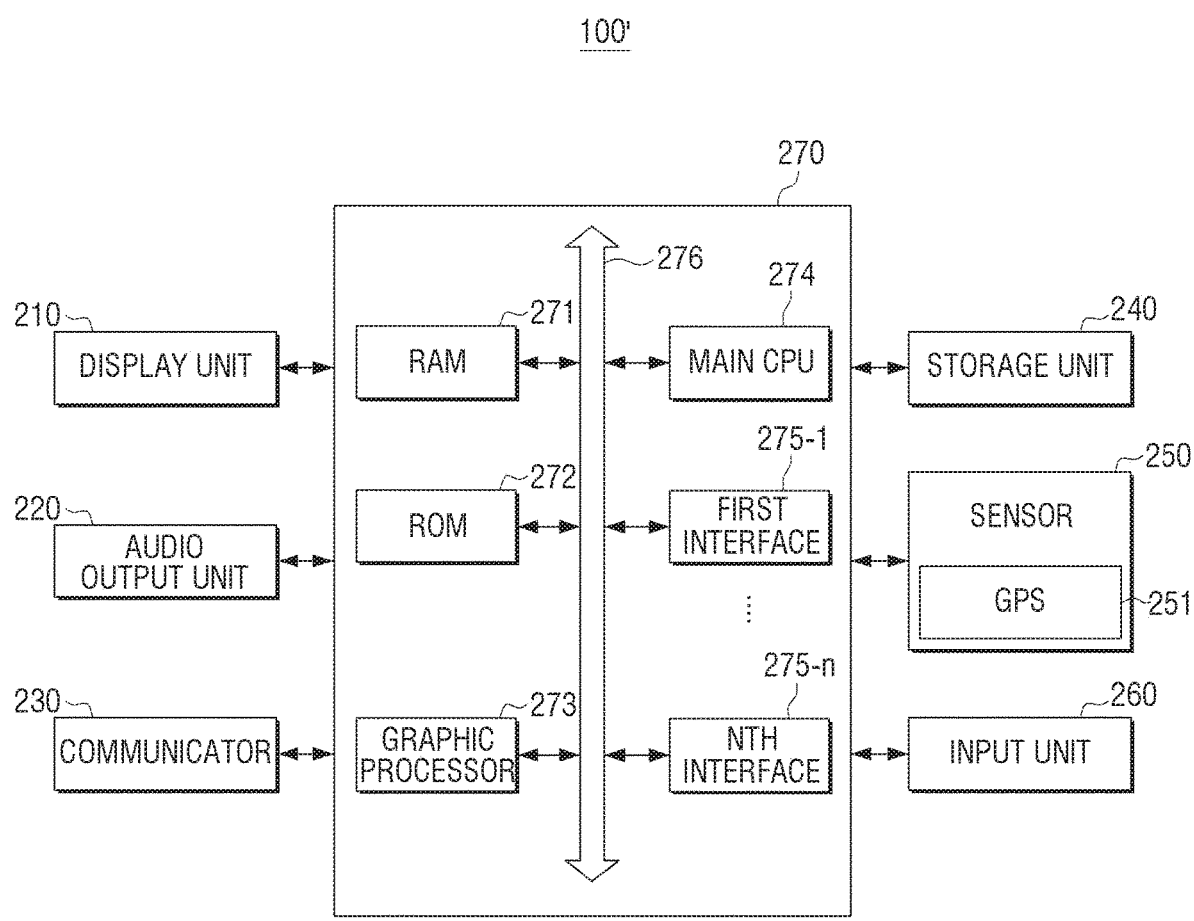
FIG. 2 is a block diagram of a detailed configuration of an electronic device according to an exemplary embodiment of the disclosure.

Hereinafter, various exemplary embodiments of the disclosure will be described with reference to FIGS. 2 through 8B. FIG. 2 is a block diagram of a detailed configuration of an electronic device 100' according to an exemplary embodiment of the disclosure. As shown in FIG. 2, the electronic device 100' includes a display unit 210, an audio output unit 220, a communicator 230, a storage unit 240, a sensor 250, an input unit 260, and a controller 270.

FIG. 2 illustrates the electronic device 100' which is a device having various functions like a display function, a touch input function, and the like, i.e., synthetically illustrates various types of elements. Therefore, according to exemplary embodiments, some of elements illustrated in FIG. 2 may be omitted or changed or other types of elements may be further added.

The display unit 210 displays at least one selected from a video frame that an image processor (not shown) generates by processing image data received from an image receiver (not shown) and various types of screens which are generated by a graphic processor 273. In particular, the display unit 210 may display an image content in at least a portion of a display screen. For example, the display unit 210 may display the image content in at least a portion of a lock screen while displaying the lock screen.

The audio output unit 220 is an element which outputs various types of audio data and various types of notification voices or voice messages on which various types of processing jobs such as decoding, amplifying, and noise filtering are performed by an audio processor (not shown). In particular, the audio output unit 220 may be realized as a speaker, but this is merely an exemplary embodiment. The audio output unit 220 may be realized as an output terminal capable of outputting audio data.

The communicator 230 is an element which performs communications with various types of external devices according to various types of communication methods. The communicator 230 may include various types of communication chips such as a WiFi chip, a Bluetooth chip, an NFC chip, a wireless communication chip, and the like. Here, the WiFi chip, the Bluetooth chip, and the NFC chip respectively perform communications according to a WiFi method, a Bluetooth method, and an NFC method. Among these, the NFC chip refers to a chip which operates according to a Near Field Communication (NFC) method using a band of 13.56 MHz among various types of RF-ID frequency bands such as 135 kHz, 13.56 MHz, 433 MHz, 860-960 MHz, 2.45

GHz, and the like. If the WiFi chip or the Bluetooth chip is used, various types of connection information such as an SSID, a session key, and the like may be transmitted and received, communications may be connected by using these, and then various types of information may be transmitted and received. The wireless communication chip refers to a chip which performs communication according to various types of communication standards such as IEEE, Zigbee, $3^{rd}$ Generation (3G), $3^{rd}$ Generation Partnership Project (3GPP), Long Term Evolution (LTE), and the like.

The storage unit 240 stores various types of modules for driving the electronic device 100'. For example, the storage unit 240 may store software including a base module, a sensing module, a communication module, a presentation module, a web browser module, and a service module. Here, the base module is a base module which processes signals respectively transmitted from pieces of hardware included in the electronic device 100' and transmits the processed signals to an upper layer module. The sensing module may be a module which collects information from various types of sensors and analyzes and manages the collected information and may include a face recognition module, a voice recognition module, a motion recognition module, an NFC recognition module, and the like. The presentation module may be a module for constituting a display screen and may include a multimedia module for playing and outputting a multimedia content and a UI rendering module for processing a UI and graphic. The communication module is a module for performing communication with an external source. The wet browser module refers to a module which accesses a web server by performing web browsing. The service module is a module including various types of applications for providing various types of services.

As described above, the storage unit 240 may include various types of program modules, but some of the various types of program modules may be omitted, changed, or added according to a type and a characteristic of the electronic device 100'. For example, if the electronic device 100' described above is realized as a tablet PC, the base module may further include a position determination module for determining a GPS-based position, and the sensing module may further include a sensing module for sensing a motion of a user.

In particular, the storage unit 240 may store image contents including photos, moving pictures, and the like. The storage unit 240 may also store importance information of an image content by tagging the importance information on the image content according to a user command input through the input unit 260.

In an exemplary embodiment of the disclosure, the storage unit 240 may be defined by including an ROM 272 and an RAM 271 of the controller 270 or a memory card (not shown) (e.g., a micro SD card, a memory stick, or the like) installed in the electronic device 100'.

The sensor 250 senses a surrounding environment of the electronic device 100'. In particular, the sensor 250 may include various types of sensors such as a GPS sensor capable of sensing position information, a motion sensing sensor (e.g., a gyro sensor, an acceleration sensor, or the like) capable of sensing a motion of the electronic device 100', a pressure sensor, a noise sensor, and the like.

The input unit 260 receives an input of a user command for controlling the electronic device 100'. In particular, the input unit 260 may include a touch input unit for receiving an input of a user command and receive a drag input through the touch input unit. The input unit 260 may also include various types of input units such as a button for receiving an input of a user command, a voice input unit, a motion input unit, a keyboard, a mouse, and the like.

The controller 270 controls an overall operation of the electronic device 100' by using various types of programs stored in the storage unit 240.

As shown in FIG. 2, the controller 270 includes the RAM 271, the ROM 272, a graphic processor 273, a main CPU 274, first through $n^{th}$ interfaces 275-1 through 275-n, and a bus 276. Here, the RAM 271, the ROM 272, the graphic processor 273, the main CPU 274, the first through $n^{th}$ interfaces 275-1 through 275-n, and the like may be connected to one another through the bus 276.

A command set and the like for system booting are stored in the ROM 272. If power is supplied through an input of a turn-on command, the main CPU 274 boots a system by coping an O/S stored in the storage unit 240 into the RAM 271 and executing the O/S according to a command stored in the ROM 272. If booting is completed, the main CPU 274 performs various types of operations by copying various types of application programs stored in the storage unit 240 into the RAM 271 and executing the application programs copied into the RAM 271.

The graphic processor 273 generates a screen including various types of objects, such as a pointer, an icon, an image, a text, and the like, by using an operator (not shown) and a renderer (not shown). The operator calculates attribute values, such as coordinate values at which objects will be respectively represented, shapes, sizes, and colors of the objects, and the like, according to a layout of the screen by using a control command received from an input unit. The renderer generates a screen having various layouts and including objects based on the attribute values calculated by the operator. The screen generated by the renderer is displayed in a display area of the display unit 210.

The main CPU 274 performs booting by accessing the storage unit 240 and using the O/S stored in the storage unit 240. The main CPU 274 also performs various types of operations by using various types of programs, contents, data, and the like stored in the storage unit 240.

The first through $n^{th}$ interfaces 275-1 through 275-n are connected to various types of elements described above. One of interfaces may be a network interface which is connected to an external device through a network.

In particular, the controller 270 controls the display unit 210 to display an image content in at least a portion of the display screen and stores importance information of the image content in the storage unit 240 by tagging the importance information on the image content according to a user command input through the input unit 260. Also, if a storage space of the electronic device 100' is used to a preset value or more, the controller 270 determines whether to delete the image content based on the importance information of the image content.

Figure 3A:
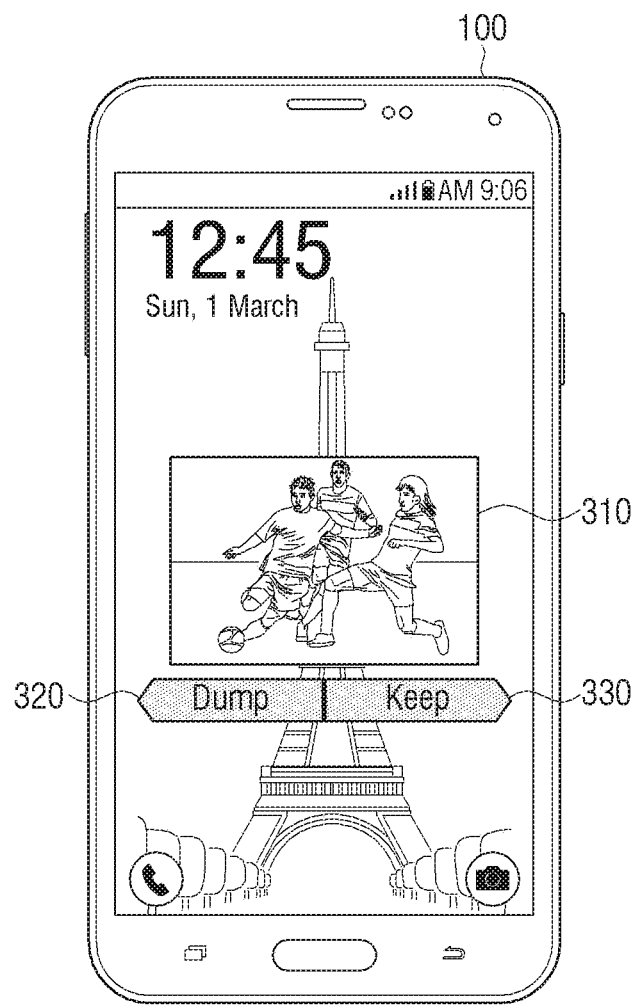
FIGS. 3A through 8B are views illustrating displaying an image content for receiving an input of a user command and managing the image content according to a user command, according to various exemplary embodiments of the disclosure.

In detail, the controller 270 may control the display unit 210 to display the image content in at least a portion of the display screen. In particular, as shown in FIGS. 3A through 3D, the controller 270 may control the display unit 210 to display an image content 310, 340, 370 or 385 in at least a portion of a lock screen while displaying the lock screen. For example, as shown in FIG. 3A, if a user command for turning on the display screen is input when the electronic device 100 is in a standby state, the controller 270 may control the display unit 210 to display the image content 310 in a frame format in at least a portion of the lock screen while displaying the lock screen. The controller 270 may also control the display unit 210 to display UI elements 320 and 330, which guide a drag direction of a user command for classifying an importance level of an image content, together with the image content 310.

Figure 3B:
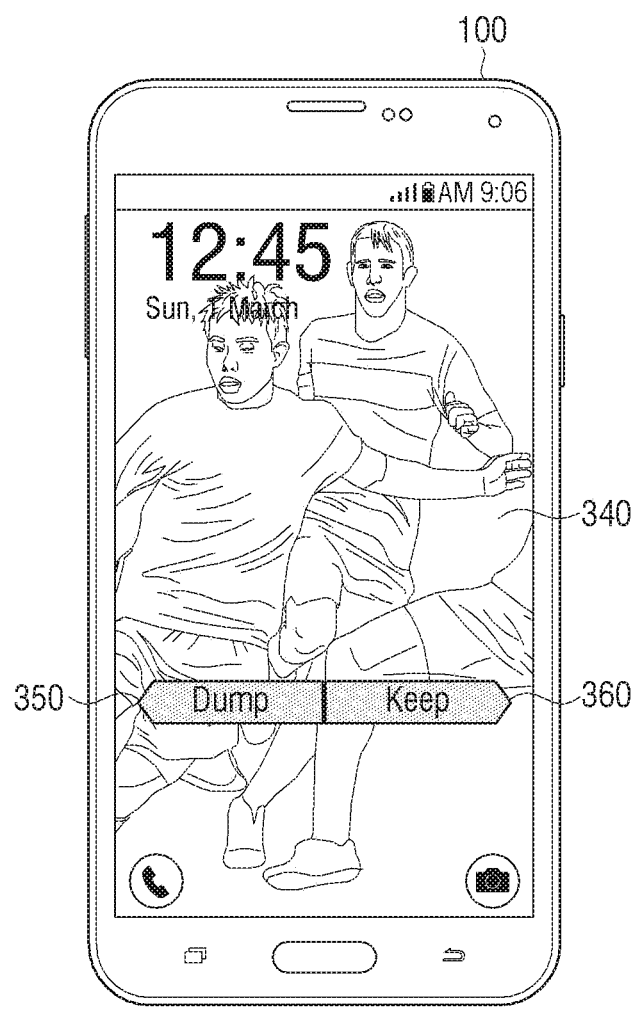

As another example, as shown in FIG. 3B, if a user command for turning on the display screen is input when the electronic device 100 is in the standby state, the controller 270 may control the display unit 210 to display the image content 340 in a whole area of the lock screen. The controller 270 may control the display unit 210 to blurredly display the image content. The controller 270 may also control the display unit 210 to display UI elements 350 and 360, which guide a drag direction of a user command for classifying an importance level of an image content, together with the image content 340.

Figure 3C:
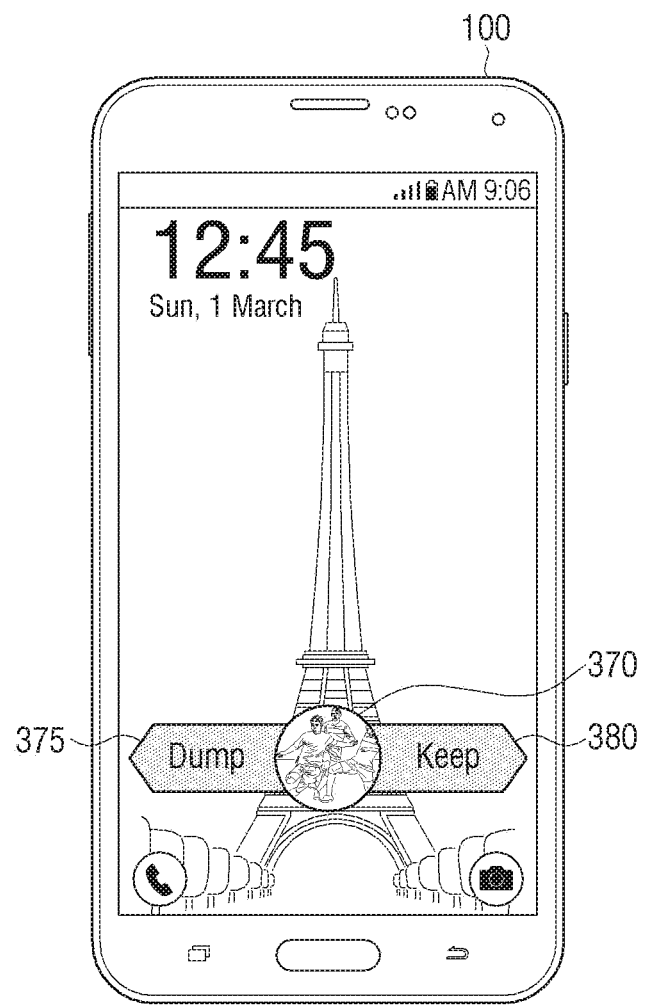
Figure 3D:
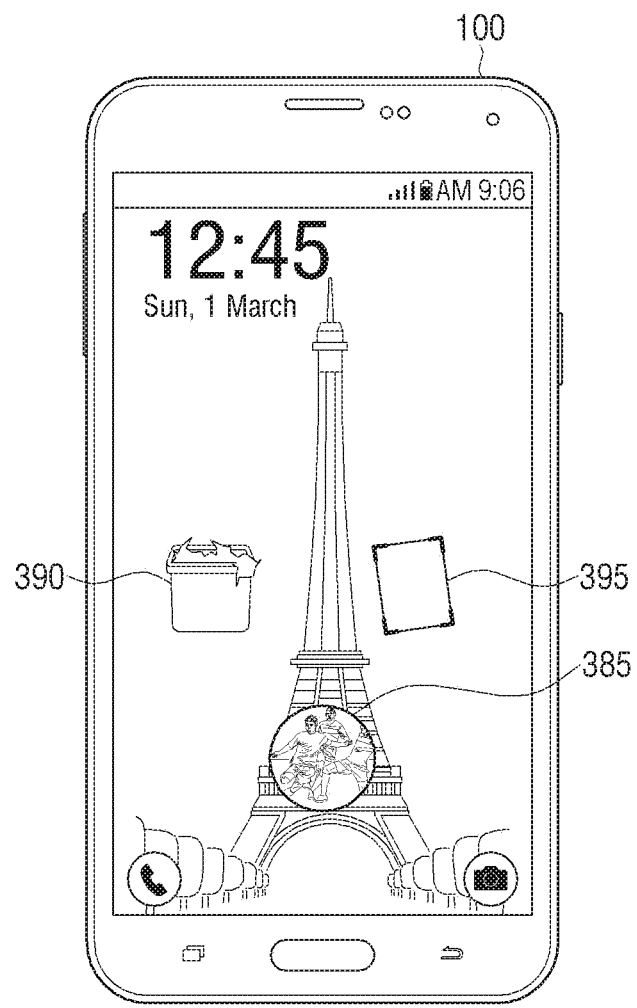

As another example, as shown in FIGS. 3C and 3D, if a user command for turning on the display screen is input when the electronic device 100 is in the standby state, the controller 270 may control the display unit 210 to display the image content 370 or 385 in an icon format in at least a portion of the lock screen. The controller 270 may control the display unit 210 to display UI elements 375 and 380, which guide a drag direction of a user command for classifying an importance level of an image content, together. Alternatively, the controller 270 may control the display unit 210 to display icons 390 and 395, which classify importance levels, together.

A method of the controller 270 displaying an image content in at least a portion of the display screen has been described with reference to FIGS. 3A through 3D, but this is merely an exemplary embodiment. The controller 270 may control the display unit 210 to display an image content merely if a particular event occurs. For example, the controller 270 may control the display unit 210 to respectively display 20 or more image contents within 12 hours in at least a portion of the display screen merely if 20 or more image contents are stored within 12 hours. Alternatively, the controller 270 may control the display unit 210 to respectively display a plurality of continuously captured photos in at least a portion of the display screen merely if the plurality of continuously captured photos are stored. Alternatively, the controller 270 may control the display unit 210 to display an image content in at least a portion of the display screen merely if a used storage space of a storage space of the electronic device 100 exceeds 70%. Alternatively, the controller 270 may control the display unit 210 to display an image content in at least a portion of the display screen merely if the electronic device 100 is located in a particular position (e.g., in a position set to a home).

Alternatively, the controller 270 may control the display unit 210 to display various types of UIs which guide a drag direction of a user command for classifying an importance level of an image content into several levels.

Figure 4A:
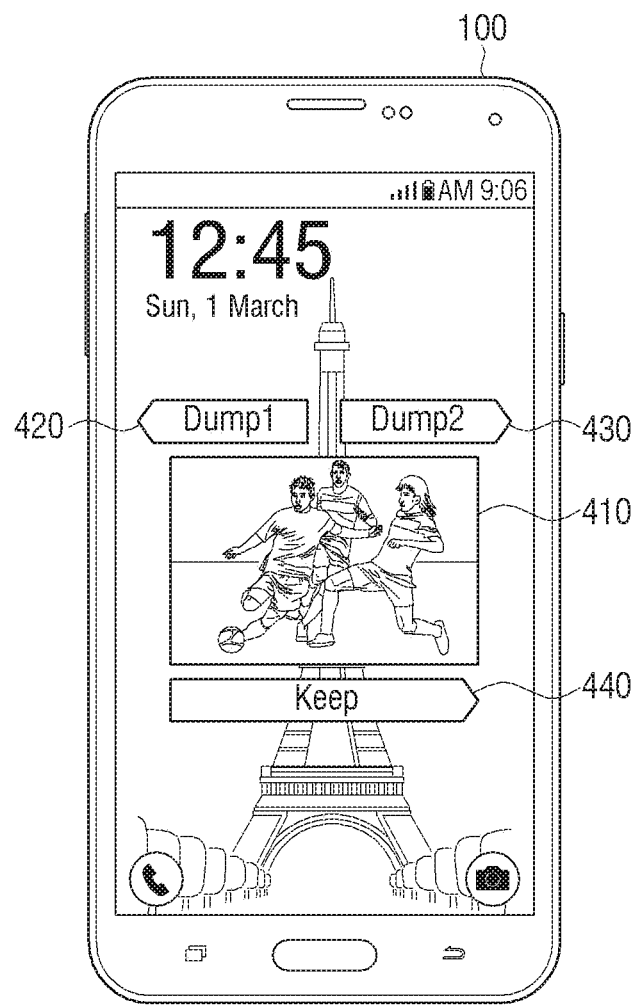

For example, as shown in FIG. 4A, the controller 270 may control the display unit 210 to classify an importance level of an image content by displaying UI elements such as dump1 420, dump2 430, and keep 440 together with an image content 410. One end of each of the UI elements 420, 430, and 440 may be formed in an arrow shape. If a user command for dragging in an arrow direction shown by each of the UI elements 420, 430, and 440 is input, the controller 270 may store each corresponding importance level in the storage unit 240 by tagging each corresponding importance level on an image content. For example, if a user command for dragging in a right direction by touching dump2 430 is input through the input unit 260, the controller 270 may store dump 2 in the storage unit 240 by tagging dump 2 on the image content 410. Also, if a storage space of the electronic device 100 is used to a preset value or more, the controller 270 may control the display unit 210 to delete image contents which are tagged with dump1 420 and stored and to display guidance words asking whether to delete image contents which are tagged with dump2 430 and stored. A UI shown in FIG. 4A has been described as being displayed together with a UI element guiding a drag direction in order to classify an importance level of an image content, but this is merely an exemplary embodiment. An input of a user command may be received through a touch input, a button input, or the like.

Figure 4B:
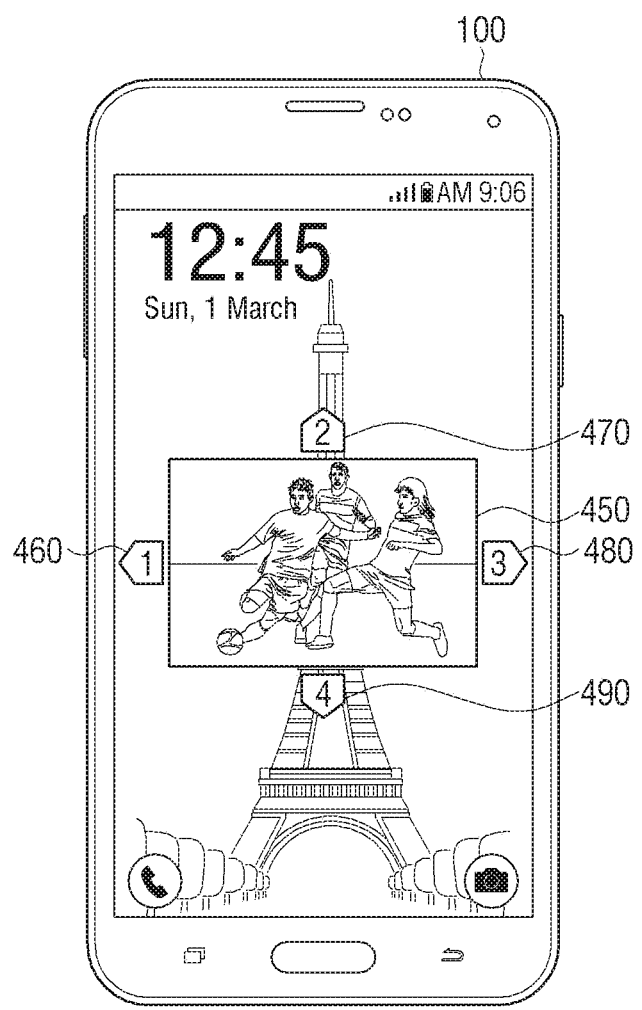

As another example, as shown in FIG. 4B, the controller 270 may control the display unit 210 to display a UI element, such as 1 460, 2 470, 3 480, or 4 490, together with an image content 450 in order to classify an importance level of an image content. Each of the UI elements 1 460, 2 470, 3 480, and 4 490 may have a high importance level as being closer to 1 but may have a low importance level as being closer to 4. Here, a UI element has been described as representing merely an importance level, but the controller 270 may control the display unit 210 to display a UI element, such as "jump", for which a user command is not input. One end of each of the UI elements 460, 470, 480, and 490 may be formed in an arrow shape. If user commands for dragging in arrow directions respectively shown by the UI elements 460, 470, 480, and 490 are input, the controller 270 may store respectively corresponding importance levels in the storage unit 240 by tagging the respectively corresponding importance levels on the image content. Also, if a storage space of the electronic device 100 is used to a preset value or more, the controller 270 may control the display unit 210 to delete image contents which are tagged with 4 490 and stored and to display guidance words asking whether to delete image contents which are tagged with 3 480 and 2 470 and stored. This is merely an exemplary embodiment, and the controller 270 may keep an image content which is tagged with 1 469 and stored and delete image contents which are tagged with 2 470, 3 480, and 4 490 and stored.

As described with reference to FIGS. 4A and 4B, an importance level of an image content is classified by displaying a UI element classifying the importance level of the image content into several levels together with the image content. However, this is merely an exemplary embodiment, and the disclosure is not limited thereto.

In detail, the controller 270 may control the display unit 210 to display an image content in at least a portion of a display screen and display a UI element for classifying an importance level of the image content together. As an example, the controller 270 may control the display unit 210 to display a UI element indicating dump and a UI element indicating keep. Also, if all image contents stored in the electronic device 100 are tagged with one of dump and keep and then stored, the controller 270 may control the display unit 210 to re-display an image content which is tagged and stored and may tag corresponding importance information, which corresponds to a user command input through the input unit 260, on existing tagged importance information and store the tagged importance information in the storage unit 240. Also, the controller 270 may determine whether to delete an image content based on a plurality of pieces of tagged importance information. For example, if an input of a user command is received by displaying each of all image contents stored in the electronic device 100 two times, importance information which is tagged on the image content may be one selected from dump-dump, dump-keep, keep-dump, and keep-keep. Also, if a storage space of the electronic device 100 is used to a preset value or more, the controller 270 may delete image contents which are tagged with dump-dump indicating that user commands having low importance levels are input both times. The controller 270 may delete image contents which are tagged with keep-dump indicating that a user command having a high importance level is input first time but a user command having a low importance level is input second time. The controller 270 may delete image contents which are tagged with dump-keep indicating that a user command having a low importance level is input first time but a user command having a high importance level is input second time.

Also, the input unit 260 may receive an input of a user command for selecting an image content, and, if a user command like pressing an image content 450 long, touching the image content 450 consecutively two times, or the like is input through the input unit 210, may control the display unit 210 not to display an image content.

Figure 5A:
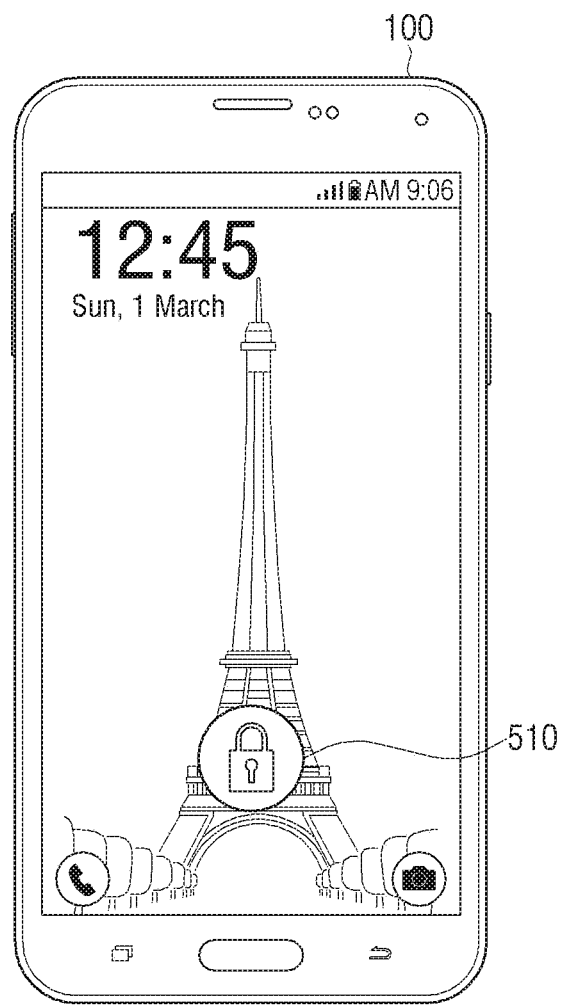
Figure 5B:
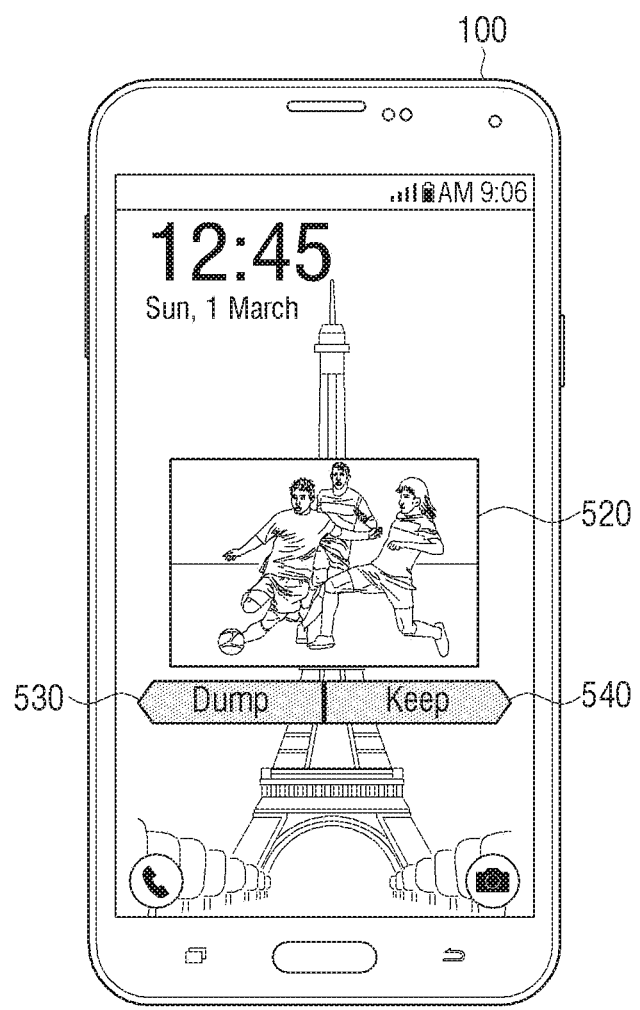

Also, as shown in FIG. 5A, if a user command for turning on a screen is input while the electronic device 100 is in a standby state, the controller 270 may control the display unit 210 to display a lock screen. Also, if a user command for unlocking the lock screen by touching or dragging a lock screen unlocking UI element 510 is input, the controller 270 unlocks the lock screen. Also, as shown in FIG. 5B, the controller 270 may control the display unit 210 to display an image content 520 together with dump 530 and keep 540, which are UI elements guiding user commands, in at least a portion of a display screen where the lock screen is unlocked. In addition, if a user command for classifying dump 530 or keep 540 is input through the input unit 260, the controller 270 may store importance information corresponding to the user command in the storage unit 240 by tagging the importance information on the image content 520. If a storage space of the electronic device 100 is used to a preset value or more, the controller 270 may delete an image content which is tagged with the dump information 530. If a user command for unlocking the lock screen is input, an image content may be prevented from being exposed to other people by unlocking the lock screen and displaying the image content.

Also, if a plurality of continuously captured image contents are stored in the electronic device 100, the controller 270 may control the display unit 210 to display the plurality of continuously captured image contents. The controller 270 may control the display unit 210 to display at least one selected from a UI element for receiving an input of a user command for classifying importance levels of a plurality of image contents and a UI element for receiving an input of a user command for classifying importance levels of the plurality of image contents through merely one-time input.

Figure 6A:
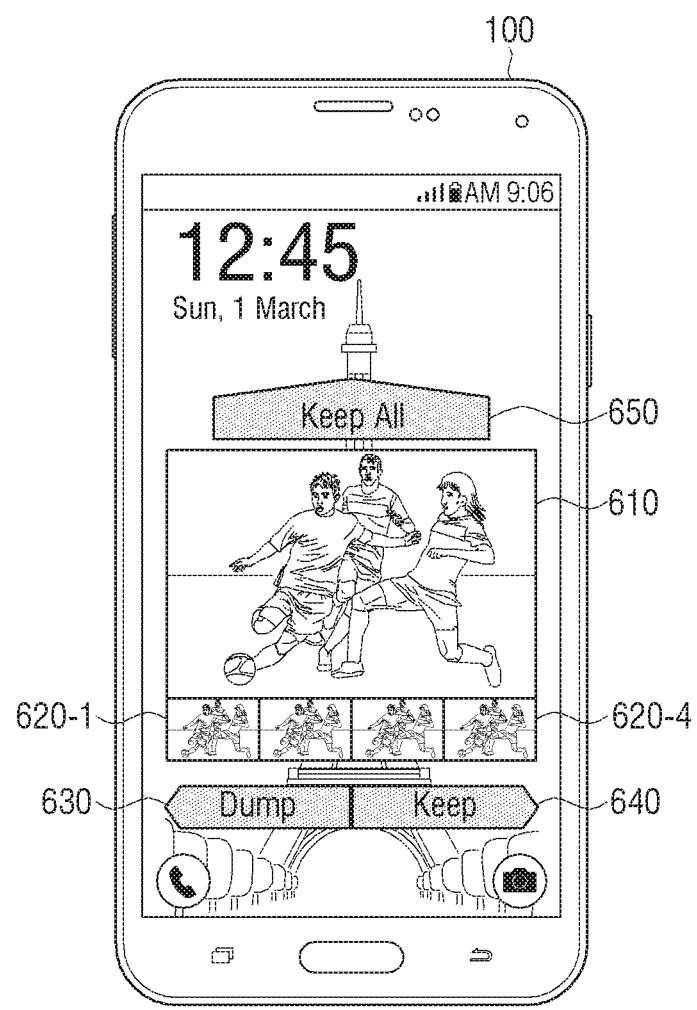
Figure 6B:
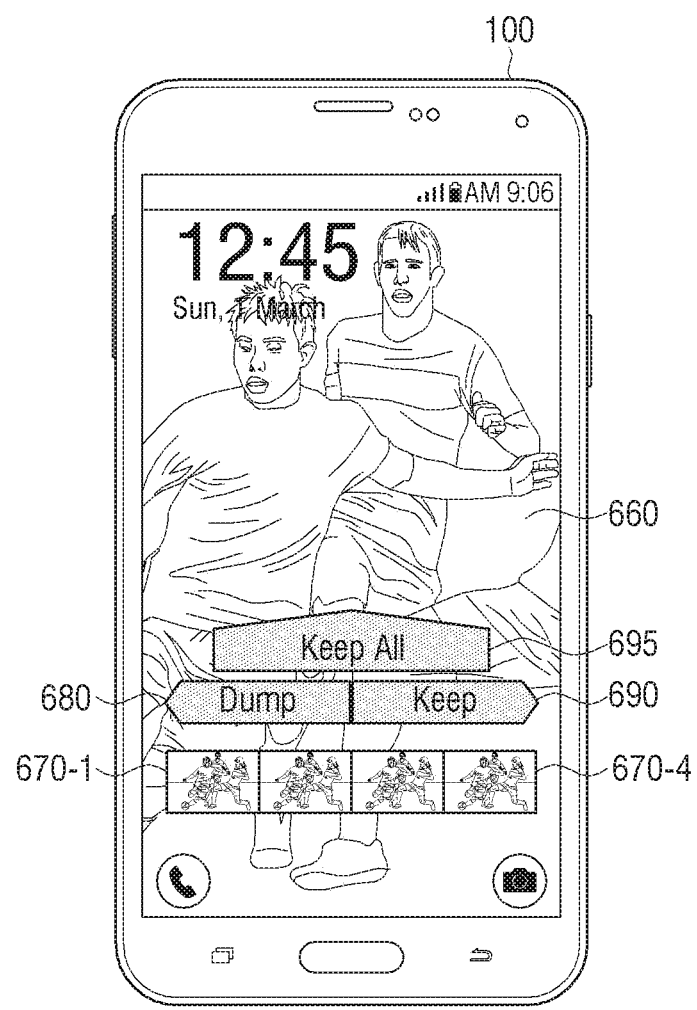

In detail, as shown in FIGS. 6A and 6B, if a plurality of continuously captured image contents are stored in the electronic device 100, the controller 270 may control the display unit 210 to display a plurality of continuously captured image contents 610, 620-1, and 620-4 together. The controller 270 may control the display unit 210 to largely display one image content 610 of image contents and small display the other image contents 620-1 through 620-4, may control the display unit 210 to display all image contents in the same sizes, or may control the display unit 210 to display the image contents in slide formats. Alternatively, the controller 270 may control the display unit 210 to display one image content 660 of image contents in a whole area of the display screen and to small enumerate and display other image contents 670-1 and 670-4.

Also, the controller 270 may control the display unit 210 to display dump 630 and keep 640 which are UI elements guiding a user command for classifying importance levels of a plurality of image contents. Alternatively, the controller 270 may control the display unit 210 to display keep all 650 for keeping all of a plurality of continuously captured image contents. Also, the controller 270 may store one of dump and keep by tagging one of dump and keep on a plurality of image content according to a user command input through the input unit 260. In addition, if a storage space of the electronic device 100 is used to a preset value or more, the controller 270 may delete an image content which is tagged with dump information.

In general, the controller 270 has been described as controlling the display unit 210 to display a UI element, which guides a user command for classifying an importance level of an image content, together with the image content but is not limited thereto. In detail, the controller 270 may control the display unit 210 to display a UI element, which guides a user command for immediately deleting or storing an image content, together with the image content. For example, the controller 270 may control the display unit 210 to display UI elements, such as "save" and "delete," together with an image content. Also, if a user command for selecting the UI element "save" is input through the input unit 260, the controller 270 may store an image content in the storage unit 240, and, if a user command for selecting the UI element "delete" is input, may immediately delete the image content.

Figure 7A:

According to another exemplary embodiment of the disclosure, as shown in FIG. 7A, if a user command 710 for opening a notification bar is input through the input unit 260, the controller 270 may control the display unit 210 to display an image content in at least a portion of a notification window. Here, the notification bar may be a display UI which is positioned at a top of a display screen of an electronic device and guides a state of the electronic device (e.g., a remaining amount of a battery, a current time, a current weather, a received message, or the like).

Figure 7B:
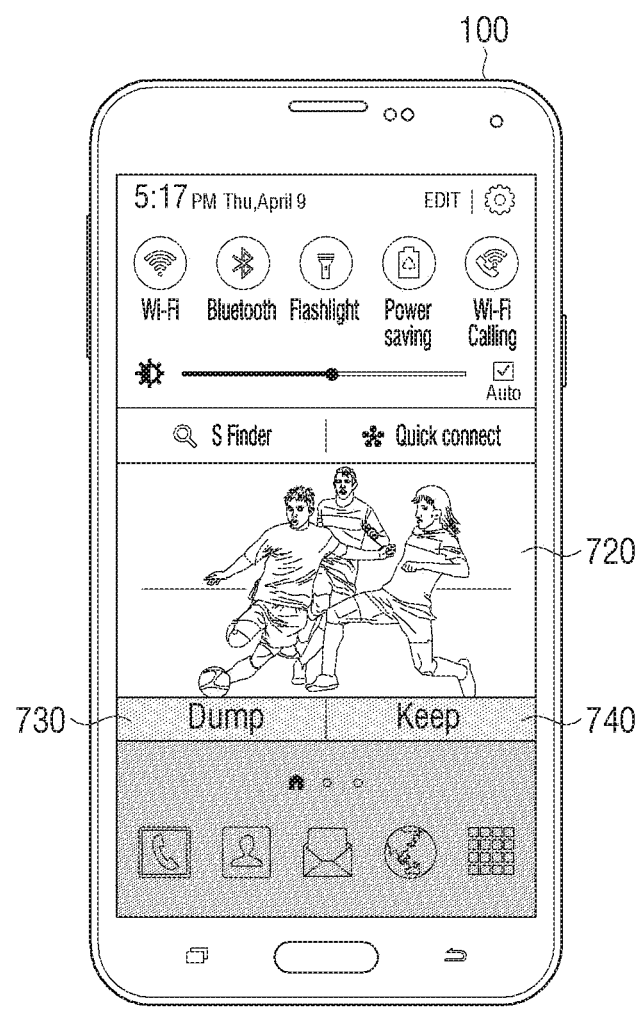

In detail, as shown in FIG. 7B, the controller 270 may control the display unit 210 to display an image content 720 in at least a portion of the notification window where the notification bar is opened. The controller 270 may also control the display unit 210 to display dump 730 and keep 740, which are UI elements guiding a user command for classifying an importance level of an image content, together with the image content 720. In addition, the controller 270 may store one of dump and keep by tagging one of dump and keep on the image content 720 according to a user command input through the input unit 260. If a storage space of the electronic device 100 is used to a preset value or more, the controller 270 may delete an image content which is tagged with dump information. Also, the controller 270 may control the display unit 210 not to display the image content 720 if two or more notifications exist on the notification bar.

Figure 8A:
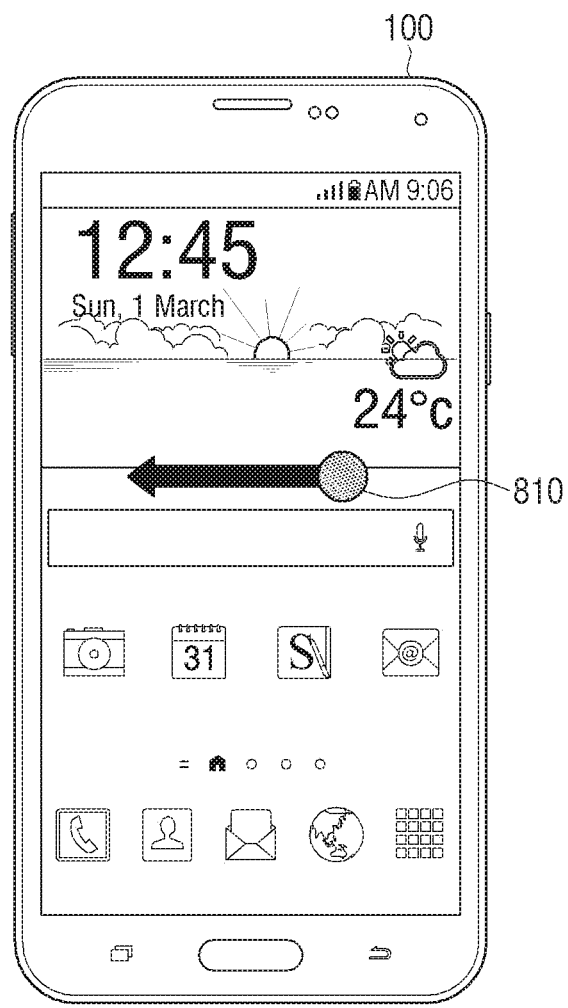
Figure 8B:
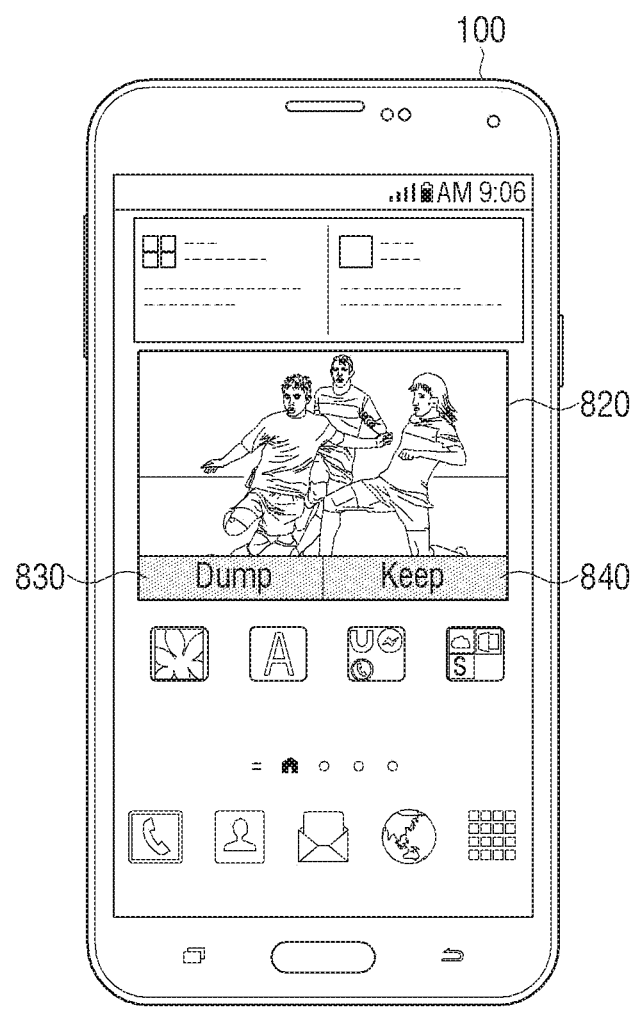

According to another exemplary embodiment of the disclosure, as shown in FIGS. 8A and 8B, the controller 270 may control the display unit 210 to display an image content 820 in at least a portion of a display screen by using a widget. The controller 270 may also control the display unit 210 to display dump 830 and keep 840, which are UI elements guiding a user command for classifying an importance level of an image content, together with the image content 820. In addition, the controller 270 may store one piece of information of dump and keep by tagging one piece of information of dump and keep on the image content 820 according to a user command input through the input unit 260. If a storage space of the electronic device 100 is used to a preset value or more, the controller 270 may delete an image content which is tagged with dump information 830.

If a user command for the image content 820 is input or a screen on which a widget is positioned is newly displayed, the controller 270 may control the display unit 210 to display different image contents.

Hereinafter, a method for controlling the electronic device 100 according to an exemplary embodiment of the disclosure will be described with reference to FIG. 9.

In operation S910, the electronic device 100 activates a display unit.

If the display unit is activated, the electronic device 100 displays a lock screen including an image content prestored in the electronic device 100 in operation S920. In particular, the electronic device 100 may display the image content in at least a portion of a display screen while displaying the lock screen. Alternatively, if a user command for unlocking the lock screen is input, the electronic device 100 may unlock the lock screen and display the image content in at least a portion of the display screen where the lock screen is unlocked. The electronic device 100 may display a UI element for receiving an input of a user command for the image content together with the image content.

In operation 930, the electronic device 100 receives an input of a user command for selecting information about the displayed image content. The electronic device 100 may receive an input of a user command through a touch input, a button input, a drag input, or the like.

If a user command is input, the electronic device 100 continuously displays the lock screen and stores information about an image content selected according to the input user command in connection with the image content in operation S940. In particular, the electronic device 100 may differently determine the information about the image content according to a drag direction in which a user command is input.

According to various exemplary embodiments of the disclosure as described above, a user may conveniently manage a storage space of an electronic device without an inconvenient process of checking an image content which is to be deleted.

The above-described method may be written as computer programs and may be implemented in general-use digital computers that execute the programs using a computer readable recording medium. Also, a data structure used in the above-described method may be recorded on a computer readable recording medium through several means. Examples of the computer readable recording medium include storage media such as magnetic storage media (e.g., ROM, floppy disks, hard disks, etc.) and optical recording media (e.g., CD-ROMs, or DVDs).

While this disclosure has been particularly shown and described with reference to exemplary embodiments thereof, it will be understood by those skilled in the art that various changes in form and details may be made therein without departing from the spirit and scope of the disclosure as defined by the appended claims. The exemplary embodiments may be considered in descriptive sense merely and not for purposes of limitation. Therefore, the scope of the disclosure is defined not by the detailed description of the disclosure but by the appended claims, and all differences within the scope will be construed as being included in the disclosure.

What is claimed is:

1. A method for controlling an electronic device, the method comprising:
   activating a display of the electronic device;
   following the activation of the display, displaying a lock screen comprising an image content prestored in the electronic device;
   receiving an input of a user command for selecting information about the displayed image content; and
   following the input of the user command, storing, by the electronic device, in connection with the image content selected according to the user command, information about the image content, while continuously displaying the lock screen,
   wherein the displaying of the lock screen comprises, following an occurrence of a particular event, displaying the lock screen comprising the image content prestored in the electronic device, the particular event comprising at least one selected from a storage of a preset number or more of image contents within a preset time, a storage of a plurality of continuously captured image contents, a storage space of the electronic device remaining to a preset value or less, a position of the electronic device in a preset place, and an input of a user command.

2. The method of claim 1, wherein the displaying of the lock screen comprises displaying the image content in at least a portion of the lock screen while displaying the lock screen.

3. The method of claim 1,
   wherein the displaying of the lock screen comprises receiving an input of a user command for unlocking the lock screen, and
   wherein, after the following of the input of the user command for unlocking the lock screen, the image content prestored in the electronic device is displayed in at least a portion of a display screen.

4. The method of claim 1, wherein the storing further comprises determining the information about the image content according to a drag direction in which the user command is input.

5. The method of claim 1, wherein the displaying of the lock screen comprises selecting and displaying the image content based on at least one selected from a time when the image content is stored in the electronic device, a name of the image content, a number of times checking the image content, or a date at which the image content is lastly opened.

6. The method of claim 1, further comprising:
   determining whether to delete the image content based on the information about the stored image content.

7. The method of claim 1, wherein the displaying of the lock screen comprises displaying the lock screen comprising the image content in at least one selected from a frame format, a background format, a button format, or an icon format.

8. An electronic device comprising:
   a display;
   an input device for receiving an input of a user command for selecting information about an image content;
   a storage; and
   at least one processor configured to:
      activate the display, following the activation of the display,
      control the display to display a lock screen comprising an image content prestored in the electronic device, following an occurrence of a particular event,
      following an input of a user command through the input device, for selecting the information about the displayed image content, control the display to continuously display the lock screen, and
      store, in connection with the image content selected according to the user command, the information about the image content in the storage, wherein the particular event comprises at least one selected from a storage of a preset number or more of image contents within a preset time, a storage of a plurality of continuously captured image contents, a storage space of the electronic device remaining to a preset value or less, a position of the electronic device in a preset place, and an input of a user command.

9. The electronic device of claim 8, wherein the at least one processor is further configured to control the display to display the image content in at least a portion of the lock screen while displaying the lock screen.

10. The electronic device of claim 8, wherein following an input of a user command through the input device, for unlocking the lock screen, the at least one processor is further configured to control the display to display the image content prestored in the electronic device in at least a portion of a display screen.

11. The electronic device of claim 8, wherein the at least one processor is further configured to determine the information about the image content according to a drag direction in which the user command is input.

12. The electronic device of claim 8, wherein the at least one processor is further configured to control the display to select and display the image content based on at least one selected from a time when the image content is stored in the electronic device, a name of the image content, a number of times checking the image content, and a date at which the image content is lastly opened.

* * * * *